United States Patent
Ijeri et al.

(10) Patent No.: US 11,208,731 B2
(45) Date of Patent: Dec. 28, 2021

(54) IRON TUNGSTEN COATING FORMULATIONS AND PROCESSES

(71) Applicant: The Boeing Company, Chicago, IL (US)

(72) Inventors: Vijaykumar S. Ijeri, Bangalore (IN); Om Prakash, Bangalore (IN); Stephen P. Gaydos, St. Louis, MO (US); Nitin Pandurang Wasekar, Hyderabad (IN); Govindan Sundararajan, Hyderabad (IN); Dameracharla Srinivasa Rao, Hyderabad (IN)

(73) Assignee: The Boeing Company, Chicago, IL (US)

(*) Notice: Subject to any disclaimer, the term of this patent is extended or adjusted under 35 U.S.C. 154(b) by 131 days.

(21) Appl. No.: 15/618,850

(22) Filed: Jun. 9, 2017

(65) Prior Publication Data

US 2018/0355498 A1    Dec. 13, 2018

(51) Int. Cl.
*C25D 3/56* (2006.01)
*C25D 5/18* (2006.01)

(52) U.S. Cl.
CPC ............. *C25D 3/562* (2013.01); *C25D 5/18* (2013.01)

(58) Field of Classification Search
CPC . C25D 3/562; C25D 3/56; C25D 5/10; C25D 5/12
USPC ................. 205/176, 181, 238, 255
See application file for complete search history.

(56) References Cited

U.S. PATENT DOCUMENTS

| | | | |
|---|---|---|---|
| 2,160,321 A | 5/1939 | Armstrong et al. | |
| 2,160,322 A | 5/1939 | Armstrong et al. | |
| 2,432,894 A * | 12/1947 | Holt ...................... | C25D 3/562 205/255 |
| 2,653,128 A | 9/1953 | Brenner et al. | |
| 5,853,556 A * | 12/1998 | Wieczerniak .......... | C25D 3/562 205/101 |
| 2011/0281108 A1* | 11/2011 | Weston .................. | C25D 3/562 428/336 |

FOREIGN PATENT DOCUMENTS

JP    H02258994    10/1990

OTHER PUBLICATIONS

Ruan et al., "Amorphization of Electrodeposited Fe—W Alloy Films and Electrochemical Behavior," Journal of Non-Crystalline Solids, 1990, pp. 752-755, vol. 117—No. 118, Elsevier Science Publishers B.V., North Holland.

(Continued)

*Primary Examiner* — Brian W Cohen
(74) *Attorney, Agent, or Firm* — Haynes and Boone, LLP

(57) ABSTRACT

An electrolyte solution for iron-tungsten plating is prepared by dissolving in an aqueous medium a divalent iron salt (e.g., iron (II) sulfate) and an alkali metal citrate (e.g., sodium citrate, potassium citrate, or other alkali metal citrate) to form a first solution, dissolving in the first solution a tungstate salt (e.g., sodium tungstate, potassium tungstate, or other potassium tungstate) to form a second solution, and dissolving in the second solution a citric acid to form the electrolyte solution. An iron-tungsten coating is formed on a substrate using the electrolyte solution by passing a current between a cathode and an anode through the electrolyte solution to deposit iron and tungsten on the substrate.

20 Claims, 17 Drawing Sheets

(56) References Cited

OTHER PUBLICATIONS

Donten et al., "Electrodeposition and properties of Ni—W, Fe—W, and Fe—Ni—W amorphous alloys. A comparative study," Electrochimica Acta 45, 2000, pp. 3389-3396, Elsevier Science Ltd, Amsterdam/Netherlands.

Donten et al., "Bulk and surface composition, amorphous structure, and thermocrystallization of electrodeposited alloys of tungsten with iron, nickel, and cobalt," J Solid State Electrochem, 1999, pp. 87-96, vol. 3, Springer-Verlag, Berlin/Germany.

Gamburg et al., "Electrodeposition, Structure, and Properties of Iron-Tungsten Alloys," Russian Journal of Electrochemistry, 2001, pp. 670-673, vol. 37—No. 7, Maik Nauka Interperiodica, Moscow/Russia.

Ahmad et al., "High Strength Ni—Fe—W and Ni—Fe—W—P Alloys Produced by Electrodeposition," Materials Transactions, 2003, pp. 1942-1947, vol. 44—No. 10, The Japan Institute of Metals, Sendai/Japan.

Tharamani et al., "Studies on electrodeposition of Fe—W alloys for fuel cell applications," Applied Surface Science, May 15, 2006, pp. 2031-2037, vol. 253, Elsevier B.V., Amsterdam/Netherlands.

Thangaraj et al., "Effect of current density on electrodeposited ferrous tungsten thin films," Indian Journal of Pure & Applied Physics, Jun. 2014, pp. 395-398, vol. 52, NISCAIR-CSIR, New Delhi/India.

"Addressing Chemicals of Concern," European Chemicals Agency (ECHA), retrieved at http://echa.europa.eu/addressing-chemicals-of-concern, Jun. 22, 2012, 1 page.

"Authorisation List," European Chemicals Agency (ECHA), retrieved at http://echa.europa.eu/addressing-chemicals-of-concern/authorisation/recommendation-for-inclusion-in-the-authorisation-list/authorisation-list, Jun. 23, 2012, 3 pages.

"Hexavalent Chromium," OSHA, retrieved at https://www.osha.gov/SLTC/hexavalentchromium/, Jan. 2, 2004, 2 pages.

\* cited by examiner

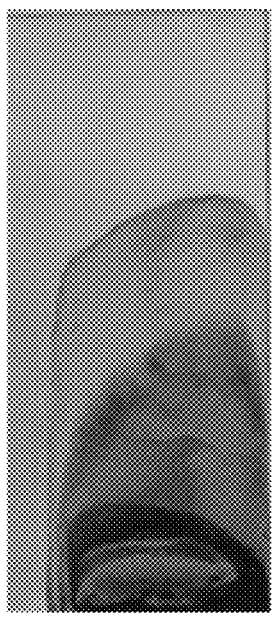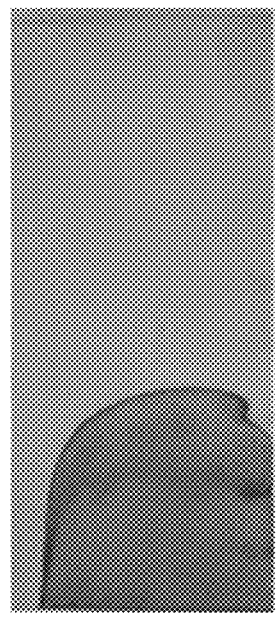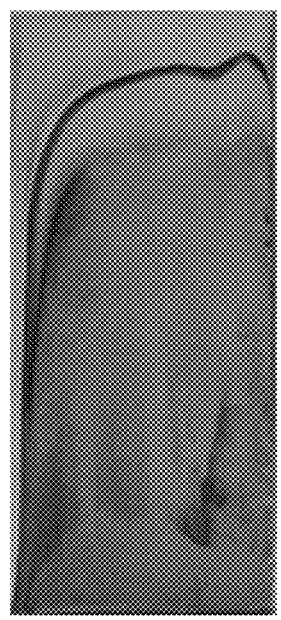

_US 11,208,731 B2_

IRON TUNGSTEN COATING FORMULATIONS AND PROCESSES

BACKGROUND

1. Technical Field

The present disclosure relates to coatings and, more particularly, to providing iron-tungsten coatings on substrates.

2. Related Art

Chrome plating is an electroplating process that provides a chrome coating on a substrate. Hard chrome plating provides a chrome coating having a thickness typically about 10 microns or greater, thereby providing hardness and wear resistance to the coated substrate. Hard chrome coatings are plated from baths containing chromic acid and catalysts based on fluorides, sulfates, or organic acids. However, such baths contain chromium in its hexavalent form (Cr-VI).

Baths with chromium in its trivalent form (Cr-III) are used for decorative chrome plating, which provides a chrome coating having a thickness typically ranging from about 0.1 to about 0.5 microns. However, there are challenges to providing thicker, hard, and functional chrome coatings using trivalent chromium baths.

Nickel-tungsten alloy coatings have been considered as an alternative to hard chrome coatings. However, nickel-based baths used for nickel-tungsten alloy coatings involve the use of nickel and often use boric acid as a buffering agent.

Thus, there is a need for improved coating methods and formulations of solutions used for coating of substrates.

SUMMARY

In accordance with embodiments of the present disclosure, various methods and formulations are provided for plating a substrate to provide an iron-tungsten coating. Advantageously, the electrolyte solution used for the plating does not include any chromium, boric acid, or nickel, while still resulting in a coating that is structurally robust and reliable, yet cost-effective. Thus, the methods and formulations described herein can advantageously be used for plating to form bright, hard coatings (e.g., robust and functional iron-tungsten alloy coatings). However, the present disclosure is not limited to bright, hard coatings and the methods and formulations described herein can also be advantageously used to effectively and efficiently provide dull coatings (e.g., dark or black coatings), which can be used, for example, when a surface that absorbs light is desirable (e.g., solar panels). The black coating, though not as hard as the bright coating, is significantly harder than the substrates such as mild steel or copper.

In one example embodiment, a method for plating a substrate using an electrolyte solution includes dissolving in an aqueous medium a divalent iron salt in an amount ranging from about 0.05 to about 0.5 mol per liter of the electrolyte solution and an alkali metal citrate in an amount ranging from about 0.05 to about 2 mol per liter of the electrolyte solution to form a first solution, dissolving in the first solution a tungstate salt in an amount ranging from about 0.1 to about 1.5 mol per liter of the electrolyte solution to form a second solution, dissolving in the second solution a citric acid in an amount ranging from about 0.01 to about 1 mol per liter of the electrolyte solution to form the electrolyte solution, and passing a current between a cathode and an anode through the electrolyte solution to deposit iron and tungsten on the substrate.

In certain aspects, the step of dissolving the divalent iron salt and the alkali metal citrate includes dissolving iron (II) sulfate in an amount ranging from about 0.05 to about 0.2 mol per liter of the electrolyte solution and sodium citrate or potassium citrate in an amount ranging from about 0.15 to about 0.5 mol per liter of the electrolyte solution. The step of dissolving the tungstate salt includes dissolving sodium tungstate or potassium tungstate in an amount ranging from about 0.15 to about 0.5 mol per liter of the electrolyte solution. The step of dissolving the citric acid includes dissolving the citric acid in an amount ranging from about 0.02 to about 0.5 mol per liter of the electrolyte solution.

In certain aspects, the step of passing the current is performed using a carbonaceous anode, a graphite anode, a platinum anode, or a platinized titanium anode to deposit iron and tungsten. The substrate on which iron and tungsten is deposited includes a steel substrate, a copper substrate, a brass substrate, a copper-coated substrate, a nickel-coated substrate, or a combination thereof.

In certain aspects, the method further includes dissolving an ammonium halide (e.g., ammonium chloride) in an amount ranging from about 0.1 to about 0.4 mol per liter of the electrolyte solution and an alkali metal halide (e.g., sodium bromide) in an amount ranging from 0.03 to about 0.15 mol per liter of the electrolyte solution. With the addition of the ammonium halide and alkali metal halide, the step of passing the current forms a dull-bright coating layer.

In certain aspects, the step of passing the current includes applying a direct current having a current density ranging from about 0.002 to about 0.04 A/cm$^2$ to form a bright hard coating layer including an alloy of iron and tungsten. Alternatively, the step of passing the current includes applying a direct current having a current density ranging from about 0.05 to about 0.1 A/cm$^2$ to form a dull coating layer including an alloy of iron and tungsten.

In certain aspects, the step of dissolving the tungstate salt includes dissolving the tungstate salt in an amount ranging from about 0.3 to about 0.45 mol per liter of the electrolyte solution such that the step of passing the current forms a bright hard coating layer including an alloy of iron and tungsten. Alternatively, the step of dissolving the tungstate salt includes dissolving the tungstate salt in an amount ranging from about 0.1 to about 0.3 mol per liter of the electrolyte solution such that the step of passing the current forms a dull coating layer including an alloy of iron and tungsten.

In certain aspects, the method further includes maintaining a temperature of about 50 to about 70° C. during the step of passing the current such that the step of passing the current forms a bright hard coating layer including an alloy of iron and tungsten. Alternatively, the method further includes maintaining a temperature of about 20 to about 50° C. during the step of passing the current such that the step of passing the current forms a dull coating layer including an alloy of iron and tungsten.

In certain aspects, the method further includes maintaining a pH ranging from about 7 to about 12 during the step of passing the current such that the step of passing the current forms a bright hard coating layer including an alloy of iron and tungsten. Alternatively, the method further includes maintaining a pH ranging from about 3 to about 7 during the step of passing the current, wherein the step of passing the current forms a dull coating layer including an alloy of iron and tungsten.

In certain aspects, the step of dissolving the citric acid includes dissolving the citric acid in an amount ranging from about 0.05 to about 0.25 mol per liter of the electrolyte solution such that the step of passing the current forms a bright hard coating layer including an alloy of iron and tungsten. Alternatively, the step of dissolving the citric acid includes dissolving the citric acid in an amount ranging from about 0.25 to about 0.5 mol per liter of the electrolyte solution such that the step of passing the current forms a dull coating layer including an alloy of iron and tungsten.

In certain aspects, the step of passing the current forms a plurality of iron-tungsten alloy coating layers including at least one bright hard coating layer and at least one dull coating layer. In certain additional aspects, the step of applying the plurality of currents includes applying a first direct or pulsed current having a first current density during at least one first time interval to form the at least one bright hard coating layer, and applying a second direct or pulsed current having a second current density during at least one second time interval to form the at least one dull coating layer.

In another example embodiment, a product including one or more iron-tungsten alloy coating layers is formed by any of the methods above. In certain aspects, the product includes at least one bright hard coating layer including an alloy of iron and tungsten having a tungsten content ranging from about 18 to about 28 At % (atomic %). In addition, or alternatively, the product includes at least one dull coating layer including an alloy of iron and tungsten having a tungsten content ranging from about 5 to about 18 At % or about 28 to about 40 At %.

In yet another example embodiment, an electrolyte solution includes a divalent iron salt in an amount ranging from about 0.05 to about 0.5 mol per liter of the electrolyte solution, an alkali metal citrate in an amount ranging from about 0.05 to about 2 mol per liter of the electrolyte solution, an alkali tungstate metal in an amount ranging from about 0.1 to about 1.5 mol per liter of the electrolyte solution, and citric acid in an amount ranging from about 0.01 to about 1 mol per liter of the electrolyte solution.

In certain aspects, the divalent iron salt includes iron (II) sulfate in an amount ranging from about 0.05 to about 0.2 mol per liter of the electrolyte solution. The alkali metal citrate includes sodium citrate or potassium citrate in an amount ranging from about 0.15 to about 0.5 mol per liter of the electrolyte solution. The tungstate salt includes sodium tungstate or potassium tungstate in an amount ranging from about 0.15 to about 0.5 mol per liter of the electrolyte solution. The citric acid is included in an amount ranging from about 0.02 to about 0.5 mol per liter of the electrolyte solution. The electrolyte solution further includes an ammonium halide (e.g., ammonium chloride) in an amount ranging from about 0.1 to about 0.4 mol per liter of the electrolyte solution and an alkali metal halide (e.g., sodium bromide) in an amount ranging from 0.03 to about 0.15 mol per liter of the electrolyte solution.

The scope of the invention is defined by the claims, which are incorporated into this section by reference. A better understanding of the methods and formulations for iron-tungsten coating of the present disclosure, as well as an appreciation of the above and additional advantages thereof, will be afforded to those of skill in the art by a consideration of the following detailed description of one or more example embodiments thereof. In this description, reference is made to the various views of the appended sheets of drawings, which are briefly described below, and within which, like reference numerals are used to identify like ones of the elements illustrated therein.

BRIEF DESCRIPTION OF THE DRAWINGS

FIG. 10A is a diagrammatic cross-section view of a bright hard coating layer formed on a substrate and a dull coating layer formed on the bright hard coating layer in accordance with an embodiment of the present disclosure.

FIG. 10B is a diagrammatic cross-section view of a dull coating layer formed on a substrate and a bright hard coating layer formed on the dull coating layer in accordance with an embodiment of the present disclosure.

FIG. 10C is a diagrammatic cross-section view of a plurality of coating layers formed on a substrate that includes at least one bright hard coating layer and at least one dull coating layer in accordance with an embodiment of the present disclosure.

FIG. 20A is an image of a 1 ampere Hull cell panel coated using the electrolyte solution prepared as shown in FIG. 1.

FIG. 20B is an image of a 1 ampere Hull cell panel coated using the electrolyte solution prepared as shown in FIG. 11.

FIG. 20C is an image of a 5 ampere Hull cell panel coated using the electrolyte solution prepared as shown in FIG. 11.

DETAILED DESCRIPTION

Figure 1:
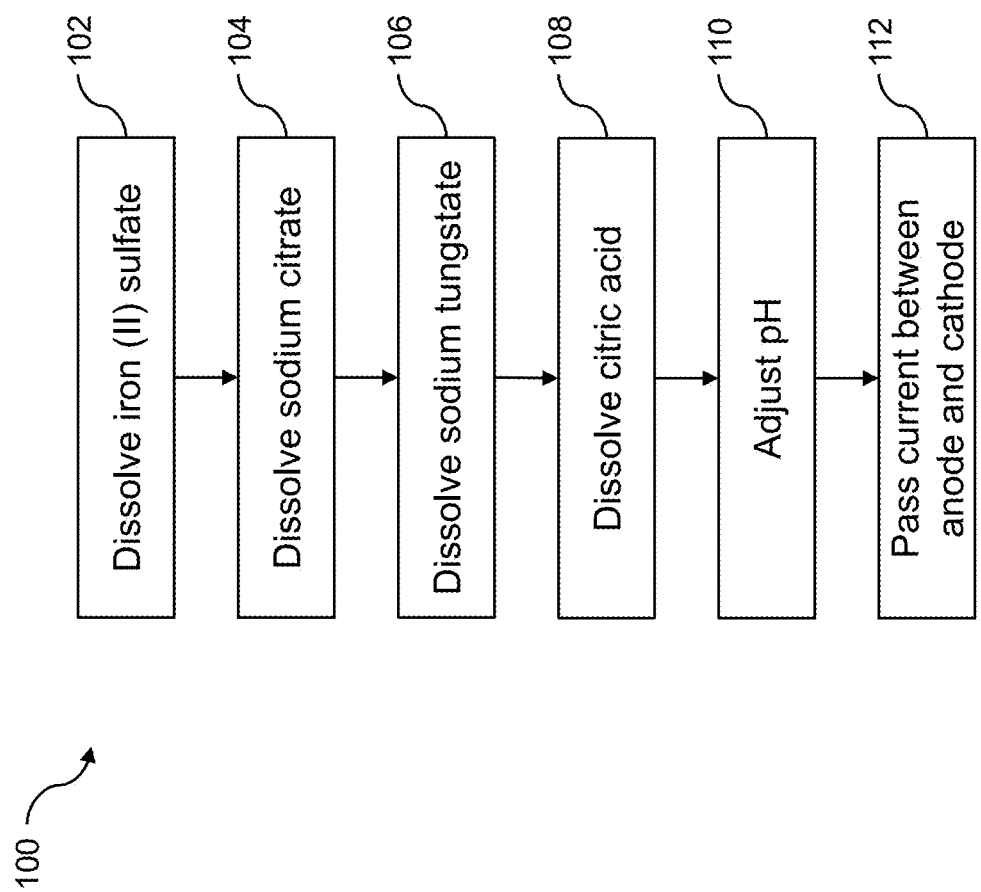
FIG. 1 illustrates an example process for forming an iron-tungsten coating on a substrate in accordance with an embodiment of the present disclosure.

FIG. 1 illustrates an example process 100 for forming an iron-tungsten coating (e.g., an iron-tungsten alloy coating or other iron-tungsten containing coating) on a substrate (e.g., a steel substrate, a copper substrate, a brass substrate, a copper-coated substrate, a nickel-coated substrate, or other metal or metal alloy substrate). Process 100 includes preparing an electrolyte solution and passing current between an anode and a cathode in the electrolyte solution. The compound of the first block is dissolved in an aqueous medium such as water, and one or more respective compounds of each subsequent block is dissolved in the solution resulting from the previously performed block to form the electrolyte solution.

At block 102, a divalent iron salt is dissolved. The divalent iron salt is a divalent iron source. The divalent iron salt includes iron (II) sulfate, iron (II) halide (e.g., iron (II) bromide, iron (II) chloride, iron (II) iodide, or other iron (II) halide), iron (II) nitrate, iron (II) acetate, iron (II) perchlorate, and/or other divalent iron salt. In certain aspects, each of these divalent iron salts includes its respective hydrated forms. For example, iron (II) sulfate has the formula $FeSO_4 \cdot xH_2O$, where x is a whole number (e.g., 0, 1, 2, 4, 5, 6, or 7). Accordingly, iron (II) sulfate is, for example, anhydrous iron (II) sulfate, iron (II) sulfate monohydrate, iron (II) sulfate dihydrate, iron (II) sulfate tetrahydrate, iron (II) sulfate pentahydrate, iron (II) sulfate hexahydrate, iron (II) sulfate heptahydrate, or iron (II) sulfate with another hydration state.

In certain aspects, the amount of the divalent iron salt that is dissolved ranges from about 0.05 mol (moles) to about 0.5 mol per liter of the electrolyte solution to be formed. The amount of the divalent iron salt that is dissolved is, for example, about 0.05 mol, 0.1 mol, 0.15 mol, 0.2 mol, 0.25 mol, 0.3 mol, 0.35 mol, 0.4 mol, 0.45 mol, or 0.5 mol per liter of the electrolyte solution, where any value can form an upper end point or a lower end point, as appropriate. The term "about," as used herein when referring to a measurable value such as an amount, concentration, time, and the like, is meant to encompass variations of ±20%, ±10%, ±5%, ±1%, ±0.5%, or even ±0.1% of the specified value.

The divalent iron salt is dissolved, for example, by stirring at ambient temperature, at room temperature, at about 25° C., or at a temperature ranging from about 20° C. to about 30° C. The stirring is performed, for example, for about 5 minutes, 10 minutes, 15 minutes, 20 minutes, 25 minutes, 30 minutes, 35 minutes, 40 minutes, 45 minutes, 50 minutes, 55 minutes, or 60 minutes, where any value can form an upper end point or a lower end point, as appropriate, or until all the divalent iron salt has been dissolved. The temperature at which block 102 is performed is, for example, about 10° C., 15° C., 20° C., 25° C., 30° C., 35° C., or 40° C., where any value can form an upper end point or a lower end point, as appropriate.

At block 104, an alkali metal citrate is dissolved. The alkali metal citrate includes sodium citrate (e.g., trisodium citrate, disodium hydrogen citrate, sodium dihydrogen citrate, or other sodium citrate), potassium citrate, and/or other alkali metal citrate. In certain aspects, each of these alkali metal citrates includes its respective hydrated forms. For example, trisodium citrate has the formula $Na_3C_6H_5O_7 \cdot xH_2O$, where x is a whole number (e.g., 0 or 2). Accordingly, trisodium citrate is, for example, anhydrous trisodium citrate, trisodium citrate dihydrate, or trisodium citrate with another hydration state.

In certain aspects, the amount of the alkali metal citrate that is dissolved ranges from about 0.05 mol to about 2 mol per liter of the electrolyte solution to be formed. The amount of the alkali metal citrate that is dissolved is, for example, about 0.05 mol, 0.1 mol, 0.2 mol, 0.3 mol, 0.4 mol, 0.5 mol, 0.6 mol, 0.7 mol, 0.8 mol, 0.9 mol, 1.0 mol, 1.1 mol, 1.2 mol, 1.3 mol, 1.4 mol, 1.5 mol, 1.6 mol, 1.7 mol, 1.8 mol, 1.9 mol, or 2.0 mol per liter of the electrolyte solution, where any value can form an upper end point or a lower end point, as appropriate.

The alkali metal citrate is dissolved, for example, by stirring at ambient temperature, at room temperature, at about 25° C., or at a temperature ranging from about 20° C. to about 30° C. The stirring is performed, for example, for about 5 minutes, 10 minutes, 15 minutes, 20 minutes, 25 minutes, 30 minutes, 35 minutes, 40 minutes, 45 minutes, 50 minutes, 55 minutes, or 60 minutes, where any value can form an upper end point or a lower end point, as appropriate, or until all the alkali metal citrate has been dissolved. The temperature at which block 104 is performed is, for example, about 10° C., 15° C., 20° C., 25° C., 30° C., 35° C., or 40° C., where any value can form an upper end point or a lower end point, as appropriate.

At block 106, a tungstate salt is dissolved. The tungstate salt includes an alkali metal tungstate (e.g., sodium tungstate, potassium tungstate, or other alkali metal tungstate), and/or other tungstate salt. In certain aspects, each of these tungstate salts includes its respective hydrated forms. For example, sodium tungstate has the formula $Na_2WO_4 \cdot xH_2O$, where x is a whole number (e.g., 0 or 2). Accordingly, sodium tungstate is, for example, anhydrous sodium tungstate, sodium tungstate dihydrate, or sodium tungstate with another hydration state.

The tungstate salt is dissolved, for example, by stirring at ambient temperature, at room temperature, at about 25° C., or at a temperature ranging from about 20° C. to about 30° C. The stirring is performed, for example, for about 5 minutes, 10 minutes, 15 minutes, 20 minutes, 25 minutes, 30 minutes, 35 minutes, 40 minutes, 45 minutes, 50 minutes, 55 minutes, or 60 minutes, where any value can form an upper end point or a lower end point, as appropriate, or until all the tungstate salt has been dissolved. The temperature at which block 104 is performed is, for example, about 10° C., 15° C., 20° C., 25° C., 30° C., 35° C., or 40° C., where any value can form an upper end point or a lower end point, as appropriate.

At block 108, a citric acid is dissolved. In certain aspects, the citric acid includes its hydrated forms. The citric acid has the formula $C_6H_8O_7 \cdot xH_2O$, where x is a whole number (e.g., 0 or 1). The citric acid is, for example, anhydrous citric acid, citric acid monohydrate, or a citric acid with another hydration state.

In certain aspects, the amount of the citric acid that is dissolved ranges from about 0.01 mol to about 1.0 mol of the electrolyte solution to be formed. The amount of the alkali metal sulfate that is dissolved is, for example, about 0.1 mol, 0.2 mol, 0.3 mol, 0.4 mol, 0.5 mol, 0.6 mol, 0.7 mol, 0.8 mol, 0.9 mol, 1.0 mol, 1.1 mol, 1.2 mol, 1.3 mol, 1.4 mol, 1.5 mol, 1.6 mol, 1.7 mol, 1.8 mol, 1.9 mol, or 2.0 mol per liter of the electrolyte solution, where any value can form an upper end point or a lower end point, as appropriate.

The citric acid is dissolved, for example, by stirring for 15 minutes at ambient temperature, at room temperature, at about 25° C., or at a temperature ranging from about 20° C. to about 30° C. The stirring is performed, for example, for about 5 minutes, 10 minutes, 15 minutes, 20 minutes, 25 minutes, or 30 minutes, where any value can form an upper end point or a lower end point, as appropriate, or until all the citric acid has been dissolved. The temperature at which block 108 is performed is, for example, about 10° C., 15° C., 20° C., 25° C., 30° C., 35° C., or 40° C., where any value can form an upper end point or a lower end point, as appropriate.

At block 110, the pH is adjusted and/or maintained. The pH is adjusted/maintained using one or more acids or bases, such as potassium hydroxide (KOH), sodium hydroxide (NaOH), and/or sulfuric acid ($H_2SO_4$). In certain aspects, the pH of the electrolyte solution is adjusted to/maintained at a target pH within the range from about 3 to about 12 (e.g., about 7.5 or a pH ranging from about 7 to 8). The pH is adjusted to/maintained, for example, at about 3, 3.5, 4, 4.5, 5, 5.5, 6, 6.5, 7, 7.5, 8, 8.5, 9, 9.5, 10, 10.5, 9, 9.5, 10, 10.5, 11, 11.5, 12, 12.5, or 13, where any value can form an upper end point or a lower end point, as appropriate. In an example, the pH is adjusted before passing the current at block 112. In another example, the pH is maintained at a target pH or a target pH range during the passing of the current at block 112. In a further example, the pH is adjusted before and maintained during the passing of the current at block 112.

In addition, or in the alternative, a temperature of the electrolyte solution is adjusted and/or maintained. In certain aspects, the temperature is adjusted to/maintained at a target temperature within the range from about 20° C. to about 70° C. The target temperature is, for example, about 20° C., 25° C., 30° C., 35° C., 40° C., 45° C., 50° C., 55° C., 60° C., 65° C., or 70° C., where any value can form an upper end point or a lower end point, as appropriate. In an example, the temperature is adjusted before passing the current at block 112. In another example, the temperature is maintained during the passing of the current at block 112. In a further example, the temperature is adjusted before and maintained during passing the current at block 112.

At block 112, a cathode and an anode are placed in the electrolyte solution, the cathode including the substrate, and a current is passed between the cathode and the anode through the electrolyte solution to deposit iron and tungsten on the substrate. In certain aspects, the substrate is a steel substrate, a copper substrate, a brass substrate, a nickel substrate, a copper-coated substrate, or a nickel-coated substrate. However, other substrates are contemplated as one skilled in the art will appreciate.

In certain aspects, the anode includes a carbonaceous electrode material. For example, the carbonaceous anode is a graphite anode or other anode that includes carbon. Advantageously, the graphite anode or other carbonaceous anode minimizes gas evolution and formation of undesirable byproducts, as well as facilitating a desirable deposition rate (e.g., ranging from about 1 microns to about 2 microns per minute). Alternatively, a platinum anode or a platinized titanium anode is used.

In some embodiments, direct current is used. In certain aspects, the direct current provides a current density ranging from about 0.002 A/cm$^2$ to about 0.1 A/cm$^2$. The value of the current density can be adjusted depending on the separation between the cathode and anode and the desired type or characteristics of the coating to be formed. The current density is, for example, about 0.002 A/cm$^2$, 0.004 A/cm$^2$, 0.006 A/cm$^2$, 0.008 A/cm$^2$, 0.01 A/cm$^2$, 0.02 A/cm$^2$, 0.03 A/cm$^2$, 0.04 A/cm$^2$, 0.05 A/cm$^2$, 0.06 A/cm$^2$, 0.07 A/cm$^2$, 0.08 A/cm$^2$, 0.08 A/cm$^2$, 0.09 A/cm$^2$, or 0.1 A/cm$^2$, where any value can form an upper end point or a lower end point, as appropriate, depending on the separation between the cathode and anode.

In other embodiments, pulsed current is used. In certain aspects, the pulsed current provides an average current density ranging from about ranging from about 0.002 A/cm$^2$ to about 0.1 A/cm$^2$. The value of the average current density can be adjusted depending on the separation between the cathode and anode. The peak current density can be twice of the average current density. The average current density is, for example, about 0.002 A/cm$^2$, 0.004 A/cm$^2$, 0.006 A/cm$^2$, 0.008 A/cm$^2$, 0.01 A/cm$^2$, 0.02 A/cm$^2$, 0.03 A/cm$^2$, 0.04 A/cm$^2$, 0.05 A/cm$^2$, 0.06 A/cm$^2$, 0.07 A/cm$^2$, 0.08 A/cm$^2$, 0.08 A/cm$^2$, 0.09 A/cm$^2$, or 0.1 A/cm$^2$, where any value can form an upper end point or a lower end point, as appropriate, depending on the separation between the cathode and anode.

In certain aspects, the pulsed current has a duty cycle ranging from about 20% to about 90%. The duty cycle is, for example, about 20%, 25%, 30%, 35%, 40%, 45%, 50%, 55%, 60%, 65%, 70%, 75%, 80%, 85%, or 90%, where any value can form an upper end point or a lower end point, as appropriate. In certain aspects, the pulsed current has a frequency ranging from about 10 Hz to about 100 Hz. The frequency is, for example, about 10 Hz, 20 Hz, 30 Hz, 40 Hz, 50 Hz, 60 Hz, 70 Hz, 80 Hz, 90 Hz, or 100 Hz, where any value can form an upper end point or a lower end point, as appropriate. For example, if the pulsed current has a duty cycle of about 40% and a frequency of about 25 Hz, the ON time is about 16 milliseconds and the OFF time is about 24 milliseconds.

In response to performing block 112, iron and tungsten is deposited on the substrate. Block 112 can be performed until an iron-tungsten coating layer having a desired thickness (e.g., a thickness greater than about 5 microns) is formed on the substrate. The iron-tungsten coating layer can be a bright hard coating as shown in FIG. 2A or a dull coating as shown in FIG. 2B depending on various conditions as shown in FIGS. 3-7 and described in further detail below.

In some embodiments, process 100 is performed in the order presented. In other embodiments, process 100 is performed in a different order. Some blocks can be performed in order while other blocks are performed in a different order. For example, blocks 102 and 104 can be performed in order, in reverse order, or concurrently, while blocks 106 and 108 are performed in order after blocks 102 and 104. In another example, block 110 can be performed before 112 or block 110 can be performed throughout block 112. Other orders are contemplated as one skilled in the art will appreciate. Further, one or more of the blocks (e.g., block 110) can be omitted in some embodiments.

Figure 2A:
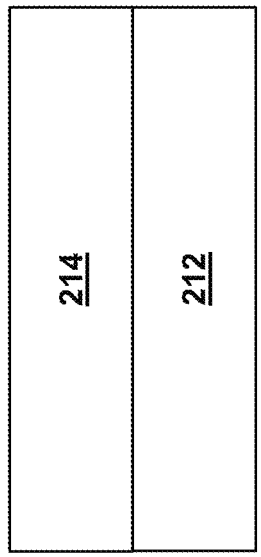
FIG. 2A is a diagrammatic cross-section view of a bright hard coating formed on a substrate in accordance with an embodiment of the present disclosure.

FIG. 2A shows a substrate 202 with a bright hard coating layer 204. Bright hard coating layer 204 is formed, for example, by process 100 of FIG. 1, in which at block 112 a direct current with a current density (or a pulsed current with an average current density) ranging from about 0.002 A/cm$^2$ to about 0.04 A/cm$^2$ is applied when the cathode and the anode is separated by about 3.5 cm. Bright hard coating layer 204 is lustrous and has a hardness greater than, for example, about 700 HV.

Figure 2B:
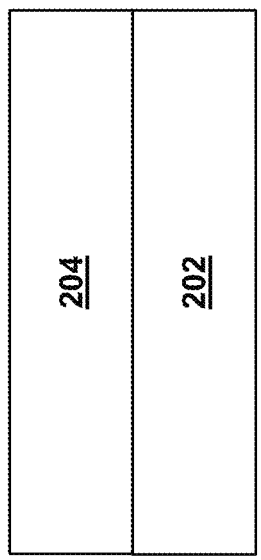
FIG. 2B is a diagrammatic cross-section view of a dull coating formed on a substrate in accordance with an embodiment of the present disclosure.

FIG. 2B shows a substrate 212 with a dull coating layer 214 (e.g., a dark coating layer or a black coating layer). Dull coating layer 214 is formed, for example, by process 100 of FIG. 1, in which at block 112 a direct current with a current density (or a pulsed current with an average current density) ranging from about 0.05 A/cm$^2$ to about 0.1 A/cm$^2$ is applied when the cathode and the anode are separated by about 3.5 cm to form dull coating layer 214. Dull coating layer 214 lacks luster compared to bright hard coating layer 204.

FIGS. 3-7 are graphs showing characteristics of iron-tungsten coatings as functions of conditions relating to the electrolyte solution or parameters for the current during plating. The conditions include brightness (bright vs. dull), hardness, tungsten content W, and current efficiency.

Figure 3:
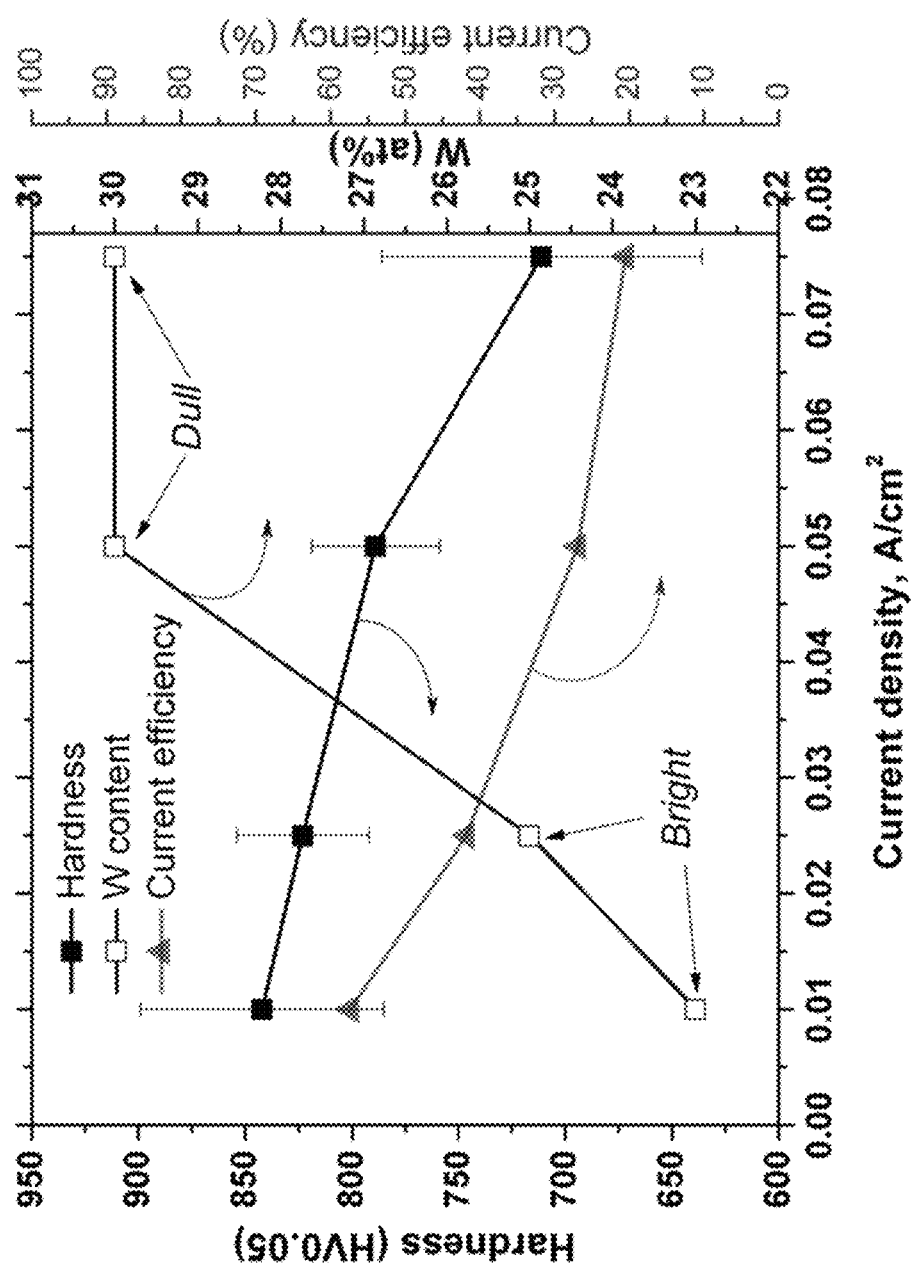
FIG. 3 is a graph showing the characteristics of iron-tungsten coatings formed using various current densities in accordance with an embodiment of the present disclosure.

FIG. 3 is a graph showing the characteristics of iron-tungsten coatings formed using various current densities. An iron-tungsten coating layer deposited using a low current density ranging from about 0.002 A/cm$^2$ to about 0.04 A/cm$^2$ (e.g., about 0.01 A/cm$^2$ or about 0.025 A/cm$^2$) at block 112 of FIG. 1 is hard and bright. A thin bright hard coating can be used for decorative purposes in place of decorative chrome plating, while a thick bright hard coating can be used as an alternative to hard chrome plating. Further, an iron-tungsten coating layer deposited using a higher current density ranging from about 0.05 A/cm$^2$ to about 0.1 A/cm$^2$ (e.g., about 0.05 A/cm$^2$ or about 0.075 A/cm$^2$) at block 112 of FIG. 1 is dull (e.g., dark or black). A dull coating can be used as solar absorptive coatings as an alternative to black chrome plating. A dull coating can also be used for decorative purposes. Although direct current was used for the current densities of FIG. 3, pulsed current can also be used in other embodiments.

Figure 4:
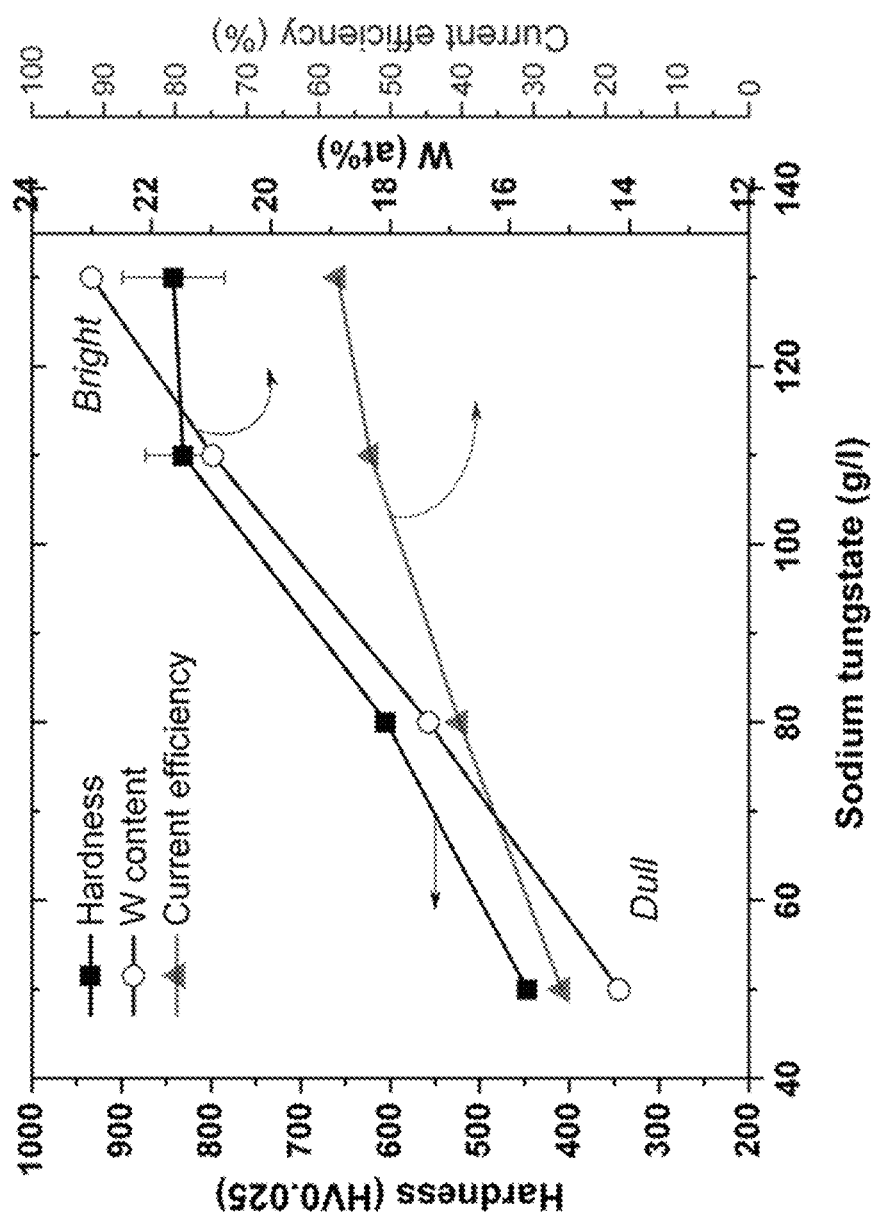
FIG. 4 is a graph showing the characteristics of iron-tungsten coatings formed with an electrolyte solution containing various amounts of tungstate salt in accordance with an embodiment of the present disclosure.

FIG. 4 is a graph showing the characteristics of iron-tungsten coatings formed with an electrolyte solution containing various amounts of tungstate salt. An iron-tungsten coating layer formed using an electrolyte solution in which the tungstate salt in an amount ranging from about 0.3 to about 0.45 mol per liter of the electrolyte solution (e.g., about 110 grams of sodium tungstate per liter of the electrolyte solution or about 130 g of sodium tungstate per liter of the electrolyte solution) is dissolved at block 106 of FIG. 1 results in a bright hard coating layer. Further, iron-tungsten coating layers formed using an electrolyte solution in which the tungstate salt in an amount ranging from about 0.1 to about 0.3 mol per liter of the electrolyte solution (e.g., about 50 grams of sodium tungstate per liter of the electrolyte solution or about 80 g of sodium tungstate per liter of the electrolyte solution) is dissolved at block 106 of FIG. 1 results in a dull coating layer.

Figure 5:
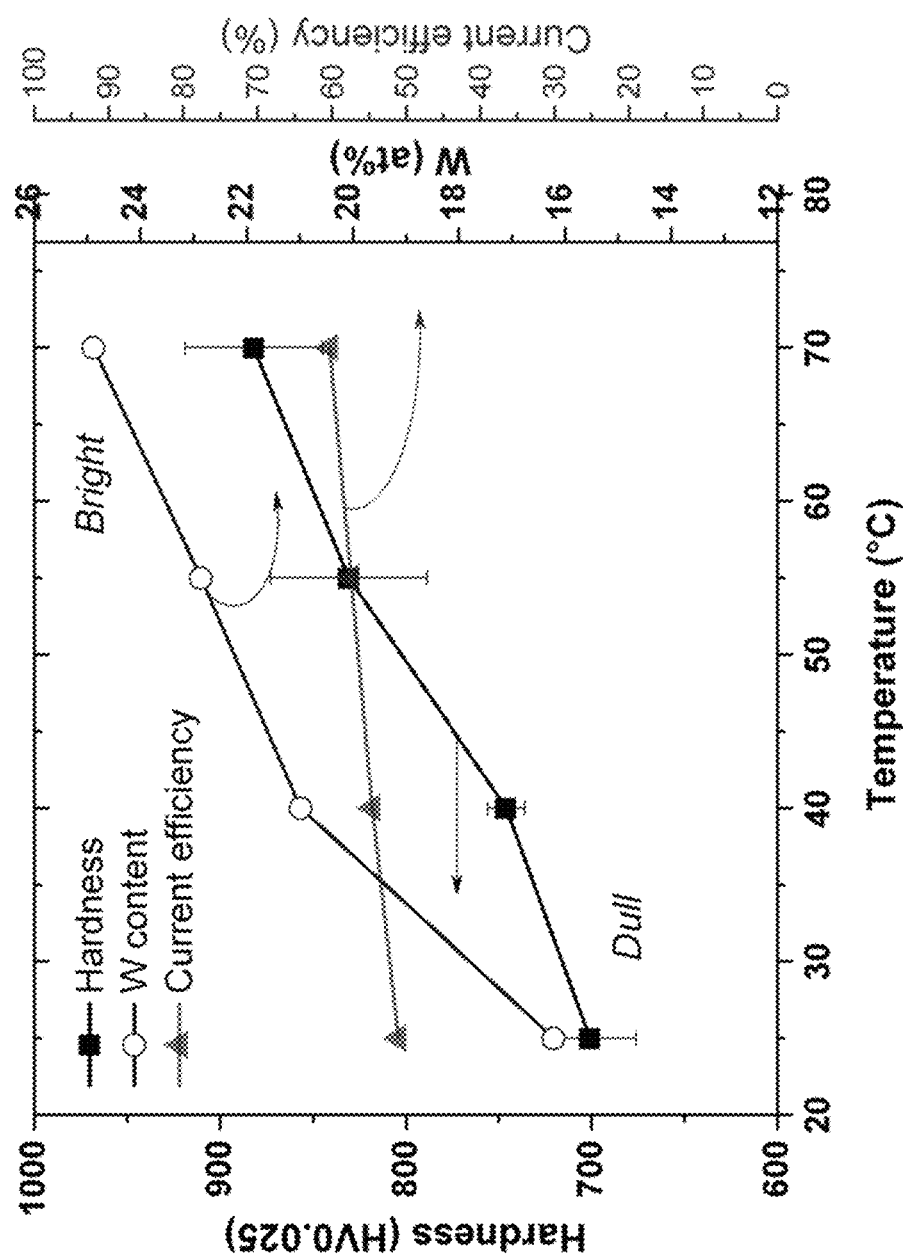
FIG. 5 is a graph showing the characteristics of iron-tungsten coatings formed at various temperatures in accordance with an embodiment of the present disclosure.

FIG. 5 is a graph showing the characteristics of iron-tungsten coatings formed at various temperatures. An iron-tungsten coating layer deposited while maintaining the temperature of the electrolyte solution at a temperature ranging from about 50° C. to about 70° C. (e.g., about 60° C. or about 70° C.) at block 110 of FIG. 1 results in a bright hard coating layer. Further, an iron-tungsten coating layer deposited while maintaining the temperature of the electrolyte solution at a temperature ranging from about 20° C. to about 50° C. (e.g., about 25° C. or about 40° C.) at block 110 of FIG. 1 results in a dull coating layer.

Figure 6:
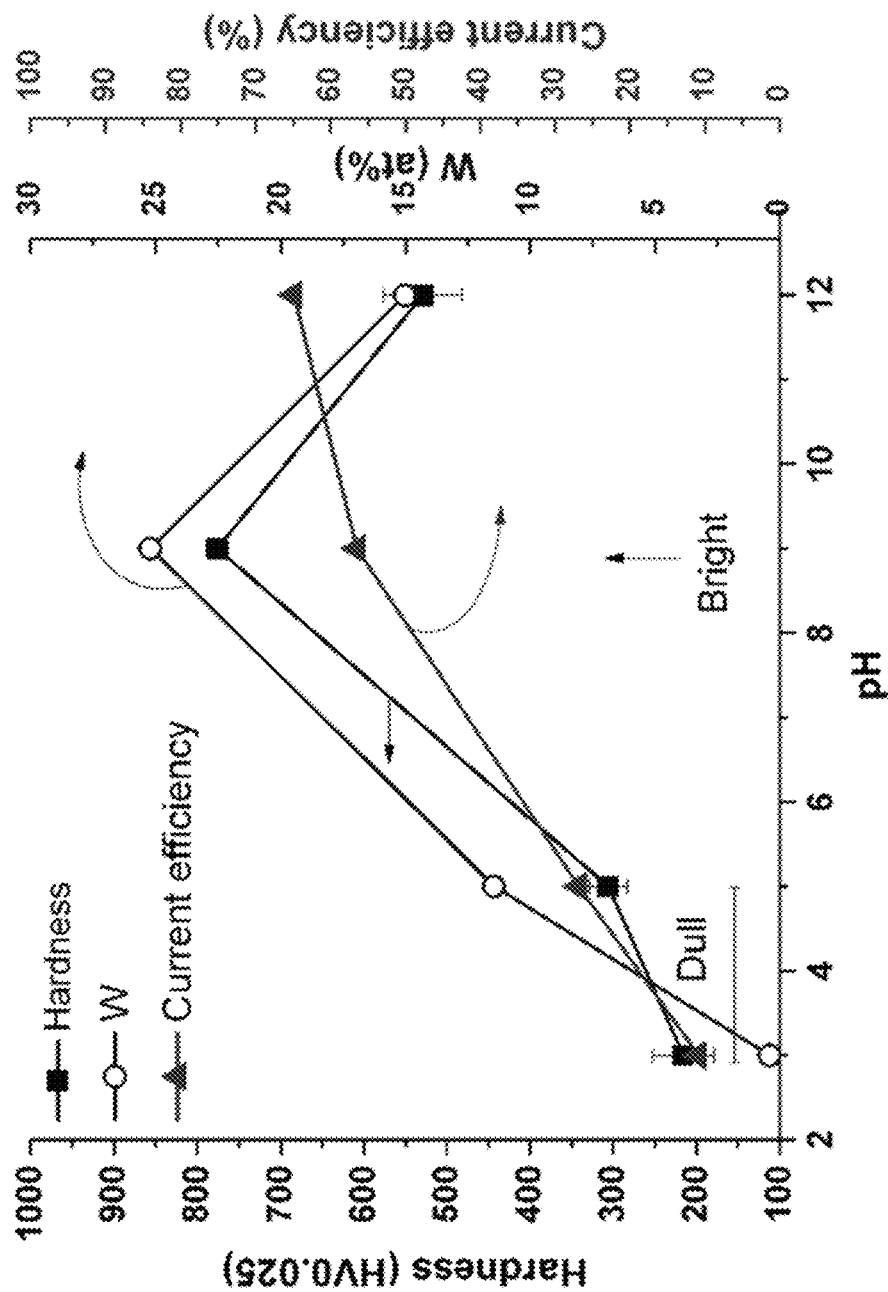
FIG. 6 is a graph showing the characteristics of iron-tungsten coatings formed by maintaining the electrolyte solution at various pH values in accordance with an embodiment of the present disclosure.

FIG. 6 is a graph showing the characteristics of iron-tungsten coatings formed by maintaining the electrolyte solution at various pH values. An iron-tungsten coating layer deposited while maintaining the pH of the electrolyte solution at a pH ranging from about 7 to about 12 (e.g., about 9 or about 12) at block 110 of FIG. 1 results in a bright hard coating layer. Further, an iron-tungsten coating layer deposited while maintaining the pH of the electrolyte solution at a pH ranging from about 3 to about 7 (e.g., about 3 or about 5) at block 110 of FIG. 1 results in a dull coating layer.

Figure 7:
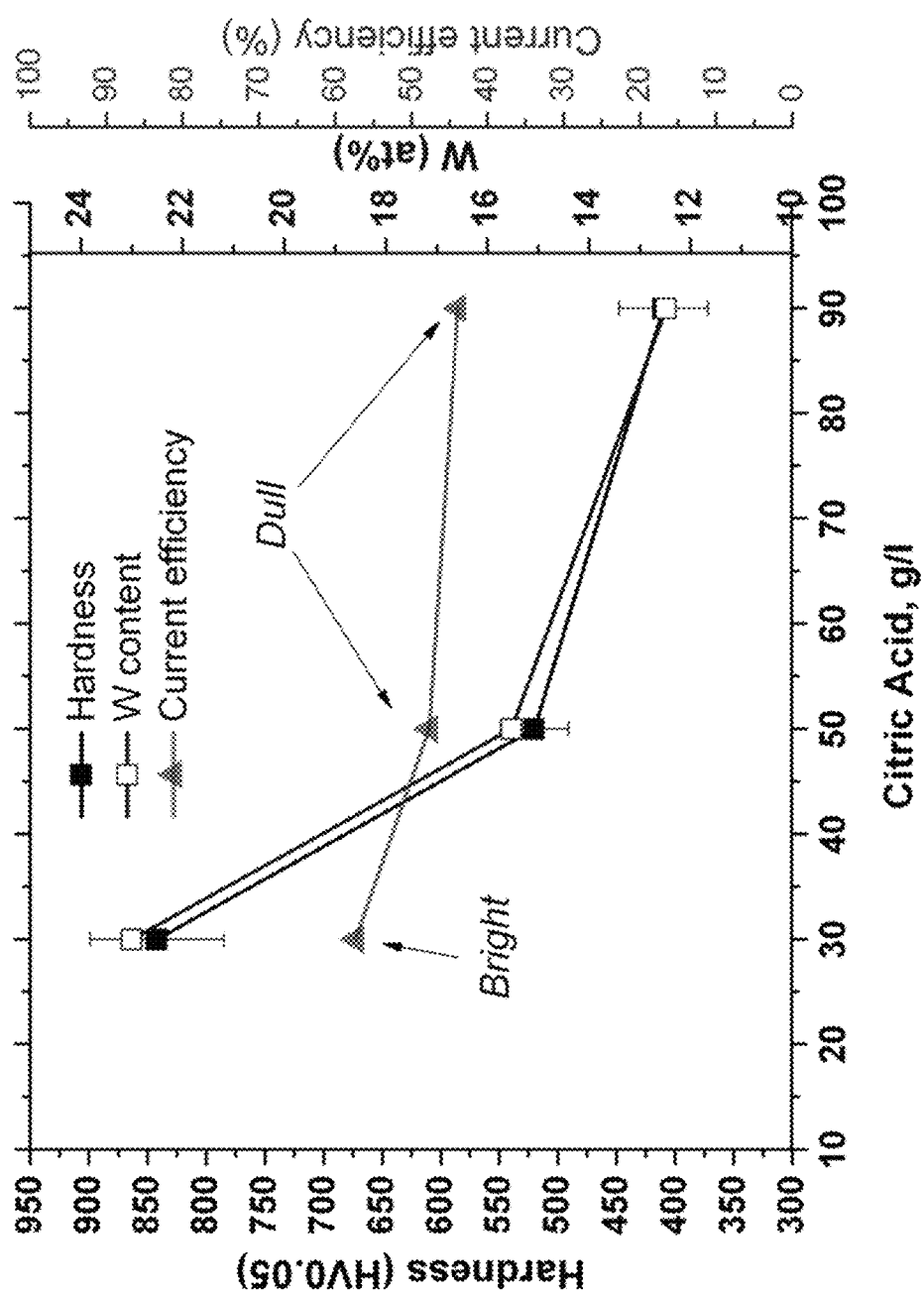
FIG. 7 is a graph showing the characteristics of iron-tungsten coatings formed with an electrolyte solution containing various amounts of a citric acid in accordance with an embodiment of the present disclosure.

FIG. 7 is a graph showing the characteristics of iron-tungsten coatings formed with an electrolyte solution containing various amounts of a citric acid. An iron-tungsten coating layer formed using an electrolyte solution in which the citric acid in an amount ranging from about 0.25 mol to about 0.5 mol per liter of the electrolyte solution (e.g., about 30 grams of anhydrous citric acid per liter of the electrolyte solution) is dissolved at block 108 of FIG. 1 results in a bright hard coating layer. Further, iron-tungsten coating layers formed using an electrolyte solution in which the citric acid in an amount ranging from about 0.1 to about 0.3 mol per liter of the electrolyte solution (e.g., about 50 grams of anhydrous citric acid per liter of the electrolyte solution or about 90 g of anhydrous citric acid per liter of the electrolyte solution) is dissolved at block 108 of FIG. 1 results in a dull coating layer.

Figure 8:
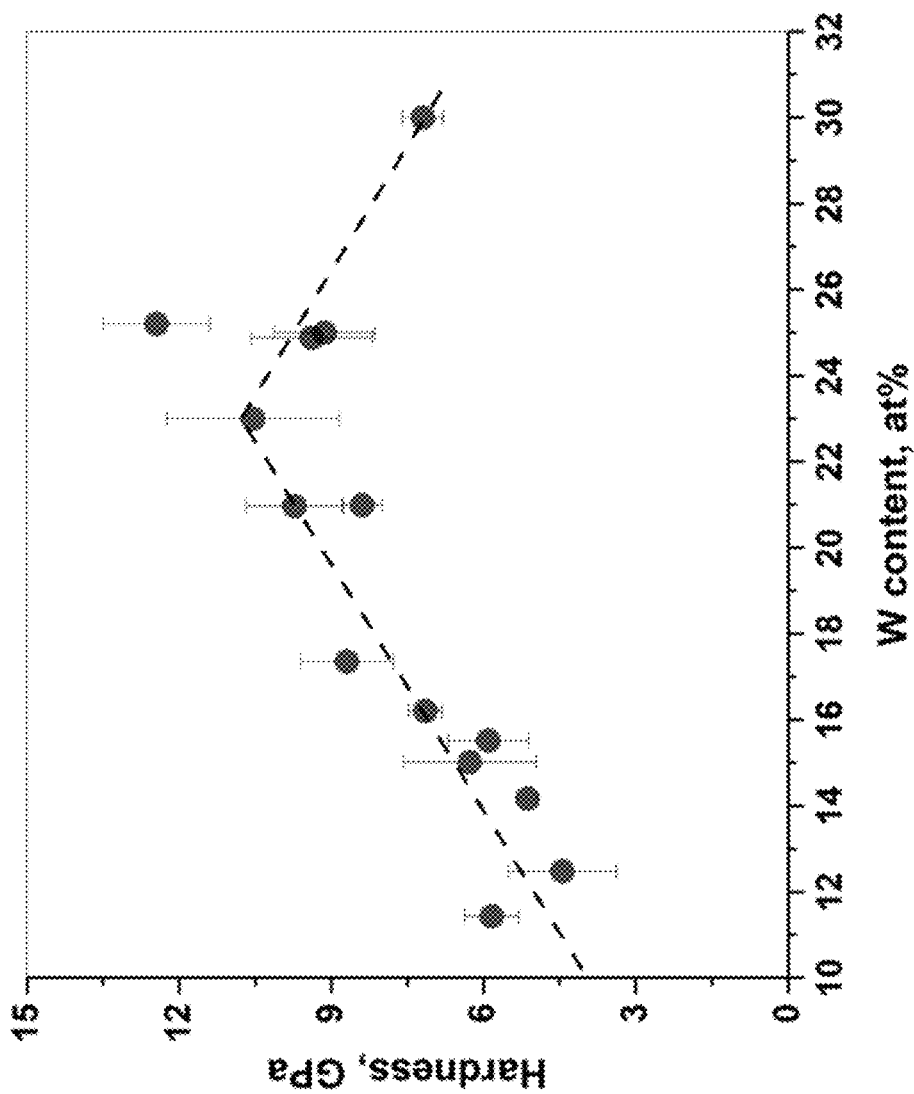
FIG. 8 is a graph showing the hardness of iron-tungsten coatings with various tungsten content in accordance with an embodiment of the present disclosure.
Figure 9:
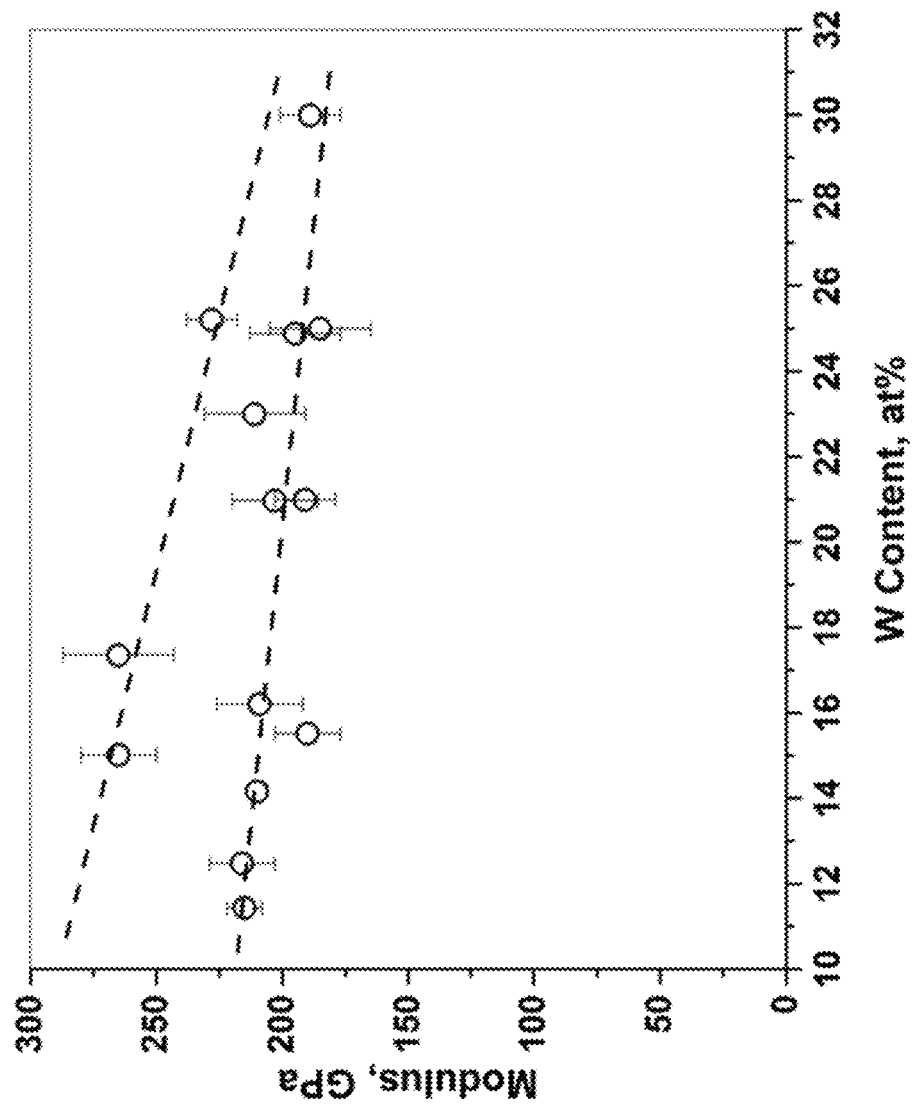
FIG. 9 is a graph showing the modulus of iron-tungsten coatings with various tungsten content in accordance with an embodiment of the present disclosure.

FIG. 8 is a graph showing the hardness of iron-tungsten coatings with various tungsten content, and FIG. 9 is a graph showing the modulus of iron-tungsten coatings with various tungsten content. The hardness and the modulus of the iron-tungsten coating depends on the ratio between iron and tungsten ("the Fe:W ratio"). The Fe:W ratio can be tailored by changing electroplating parameters such as current density, pH, or temperature (as shown in FIGS. 3, 5, and 6). Thus, iron-tungsten coatings with different Fe/W compositions and properties can be formed from the same electrolyte solution. Alternatively, or in addition, the Fe:W ratio can be tailored by changing the electrolyte solution content as shown in FIGS. 4 and 7).

The iron-tungsten coatings is a bright hard coating or a dull coating based on the Fe:W ratio. Accordingly, in some aspects the bright hard coating is defined by its tungsten content, for example, an iron-tungsten coating having a tungsten content ranging from about 18 At % to about 28 At %. The dull coating is defined by its tungsten content, for example, an iron-tungsten coating having a tungsten content ranging from about 5 At % to about 18 At % or about 28 At % to about 40 At %. This can be in addition to or alternatively from defining the bright hard coating and the dull coating in terms of its luster or lack thereof.

FIGS. 10A-10C are diagrammatic cross-sectional views of a plurality of coating layers formed on substrates. A plurality of coating layers is formed on a substrate, for example, by varying the current at block 112 of FIG. 1.

FIG. 10A is a diagrammatic cross-section view of a substrate 1002 with a bright hard coating layer 1004 formed on substrate 1002 and a dull coating layer 1006 formed on bright hard coating layer 1004. For example, at block 112 of FIG. 1, a current density of about 0.01 A/cm$^2$ is applied for a first time period to form bright hard coating layer 1004 having a tungsten content of about 23 At %, and then a current density of about 0.07 A/cm$^2$ is applied for a second time period to form dull coating layer 1006 having a tungsten content of about 30 At %.

FIG. 10B is a diagrammatic cross-section view of a substrate 1012 with a dull coating layer 1014 formed on substrate 1012 and a bright hard coating layer 1016 formed on bright hard coating layer 1014. For example, at block 112 of FIG. 1, a current density of about 0.05 A/cm$^2$ is applied for a first time period to form dull coating layer 1014 having a tungsten content of about 30 At %, and then a current density of about 0.01 A/cm$^2$ is applied for a second time period to form bright hard coating layer 1006 having a tungsten content of about 23 At %.

FIG. 10C is a diagrammatic cross-section view of a substrate 1022 with a plurality of coating layers 1024, 1026, 1028, and 1030 formed on substrate 1022. For example, at block 112 of FIG. 1, a current density of about 0.01 A/cm$^2$ is applied for a first time period to form bright hard coating layer 1024 having a tungsten content of about 23 At %, then a current density of about 0.025 A/cm$^2$ is applied for a second time period to form bright hard coating layer 1026 having a tungsten content of about 25 At %, then a current density of about 0.04 A/cm$^2$ is applied for a third time period to get a dark dull layer having a tungsten content of about 28 At %, and a then a current density of about 0.07 A/cm$^2$ is applied for a fourth time period to get a black dull layer having a tungsten content of about 30 At %. Although four steps of current densities/time periods are used for the coating in FIG. 10C, any number of current densities/time periods can be used to provide the desired number of coating layers in other examples.

The coating layers of FIGS. 10A-10C can be formed by varying other electroplating parameters or by changing the electrolyte solution during plating. Further, in certain aspects an electroplating parameter such as current density is varied in steps (as described in relation to FIGS. 10A-10C above). Alternatively, the electroplating parameter is varied gradually. The current density can be increased each step (e.g., as described in relation to FIG. 10C above), the current density can be decreased each step, or the current density can vary without such trends in other examples. The layers are equal in thickness as shown in FIG. 10A or, alternatively, the layers have different thicknesses as shown in FIGS. 10B-10C.

Figure 11:
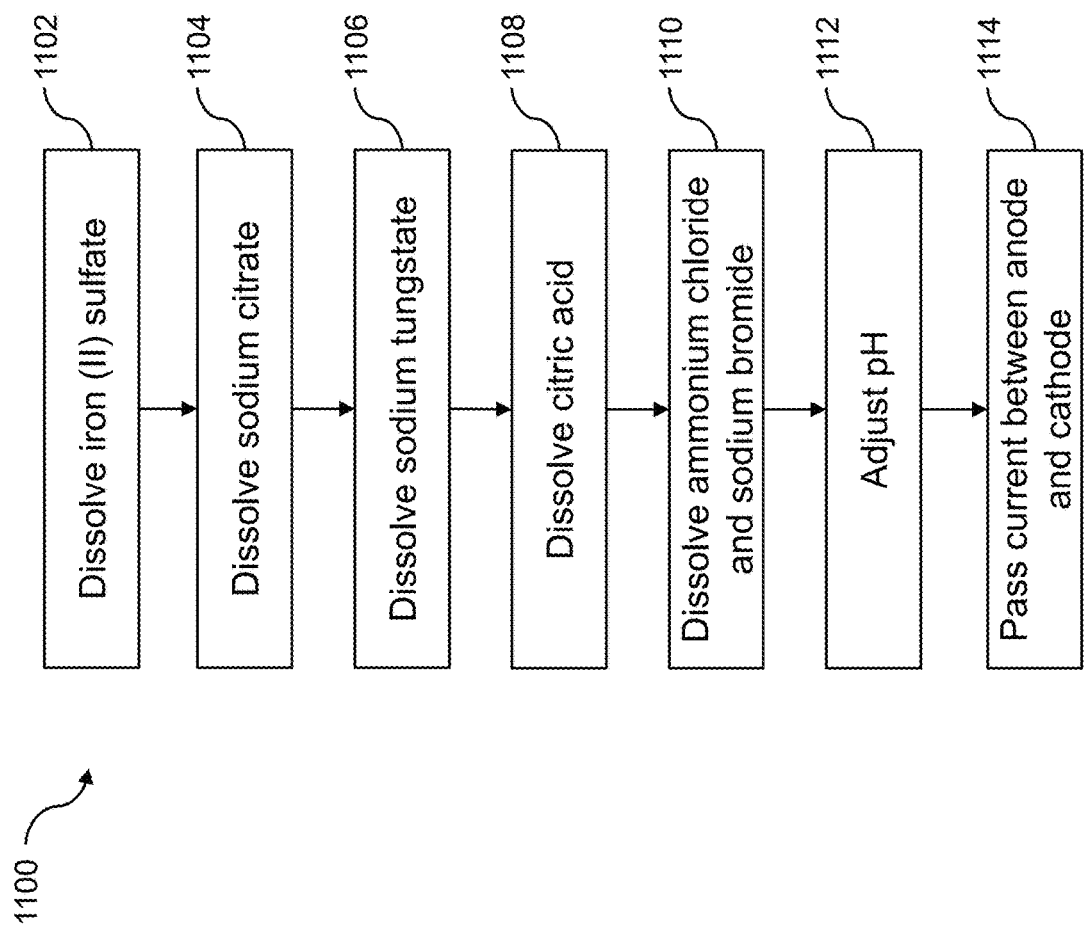
FIG. 11 illustrates an example process for forming an iron-tungsten coating on a substrate using an electrolyte solution with additives in accordance with an embodiment of the present disclosure.

FIG. 11 illustrates an example process 1100 for forming an iron-tungsten coating on a substrate using an electrolyte solution with additives. Blocks 1102, 1104, 1106, 1108, 1112, and 1114 are as described in blocks 102, 104, 106, 108, 110, and 112, respectively. At block 1110, additives such as an ammonium halide (e.g., ammonium chloride) and/or an alkali metal halide (e.g., sodium bromide) are dissolved. In certain aspects, an ammonium halide in an amount ranging from about 0.1 to about 0.4 mol per liter of the electrolyte solution and an alkali metal halide in an amount ranging from 0.03 to about 0.15 mol per liter of the electrolyte solution is dissolved. The amount of the ammonium halide that is dissolved is, for example, about 0.1 mol, 0.15 mol, 0.2 mol, 0.25 mol, 0.3 mol, 0.35 mol, or 0.4 mol per liter of the electrolyte solution, where any value can form an upper end point or a lower end point, as appropriate. The amount of the alkali metal halide that is dissolved is, for example, about 0.03 mol, 0.04 mol, 0.05 mol, 0.06 mol, 0.07 mol, 0.08 mol, 0.09 mol, 0.1 mol, 0.11 mol, 0.12 mol, 0.13 mol, 0.14 mol, or 0.15 mol per liter of the electrolyte solution, where any value can form an upper end point or a lower end point, as appropriate. A dull-bright coating is formed from the electrolyte solution including the additives at block 1114.

EXAMPLE 1

Iron (II) sulfate heptahydrate in the amount of about 30 g (about 0.11 mol) per liter of electrolyte solution to be formed is dissolved in water, which results in a light green solution. Although iron (II) sulfate heptahydrate was used in this example, one or more other divalent iron salts (e.g., iron (II) sulfate with other hydration state, iron (II) bromide, iron (II) chloride, iron (II) iodide, iron (II) nitrate, iron (II) acetate, iron (II) perchlorate, or other divalent iron salt) can be used instead of, or in addition to, chromium (III) chloride. Then, sodium citrate dihydrate in the amount of about 85 grams (about 0.29 mol) per liter of the electrolyte solution to be formed is dissolved in the light green solution, which results in a dark green solution. Although sodium citrate dihydrate was used in this example, one or more other alkali metal citrates (e.g., sodium citrate with other hydration state, other trisodium citrate, disodium hydrogen citrate, sodium dihydrogen citrate, potassium citrate, or other alkali metal citrate) can be used instead of, or in addition to, sodium citrate. Then, sodium tungstate dihydrate in the amount of about 130 grams (about 0.27 mol) per liter of the electrolyte solution to be formed is dissolved in the dark green solution, which forms a yellow-brown solution. Although sodium tungstate dihydrate was used in this example, one or more other tungstate salts (e.g., sodium tungstate with other hydration state, potassium tungstate, or other tungstate salt) can be used instead of, or in addition to, sodium tungstate dihydrate. Then, anhydrous citric acid in the amount of about 33 grams (about 0.26 mol) per liter of the electrolyte solution to be formed is dissolved in the yellow-brown solution, which forms a dark brown solution. Although anhydrous citric acid was used in this example, one or more other citric acid (e.g., citric acid monohydrate or other citric acid) can be used instead of, or in addition to, anhydrous citric acid.

EXAMPLE 2

Figure 13A:
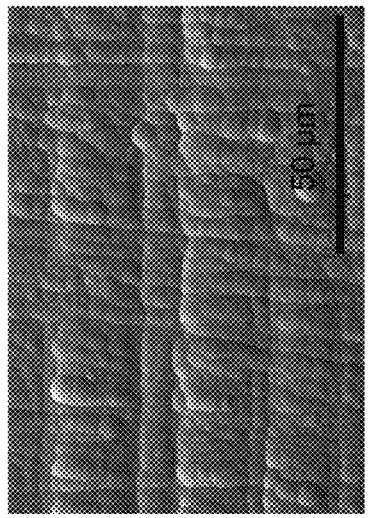
FIG. 13A is a scanning electron microscopy (SEM) image of the bright hard coating of FIG. 12A formed using a current density of about 0.01 A/cm$^2$.
Figure 12A:
FIG. 12A is an image of a bright hard iron-tungsten coating formed on a mild steel alloy in accordance with an embodiment of the present disclosure.
Figure 14:
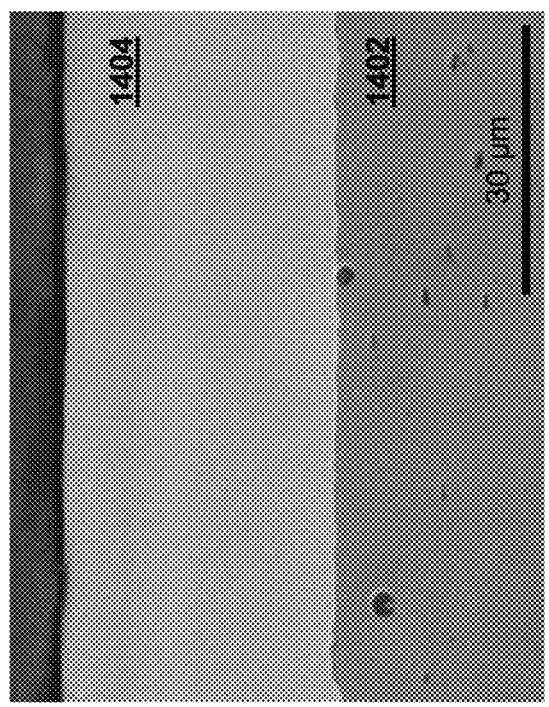
FIG. 14 is an SEM image of a cross-section of the bright hard coating of FIG. 12A in accordance with an embodiment of the present disclosure.

The resulting electrolyte solution of Example 1 was pH adjusted to about 7.5. A mild steel substrate was plated by passing a direct current using a platinized titanium mesh anode. The current density was maintained at about 0.01 A/cm$^2$, the temperature was maintained at about 60° C., and the pH was maintained at about 7.5. The pH adjustment may be done, for example, by adding small amounts of sodium hydroxide, potassium hydroxide or sulphuric acid. A bright hard coating was formed on the mild steel substrate as shown in FIG. 12A. A scanning electron microscopy (SEM) image of the bright hard coating of FIG. 12A is shown in FIG. 13A. FIG. 14 shows an SEM image of a cross-section of a mild-steel substrate 1402 with a bright hard coating 1404. Bright hard coating 1404 is dense and compact.

EXAMPLE 3

Figure 13B:
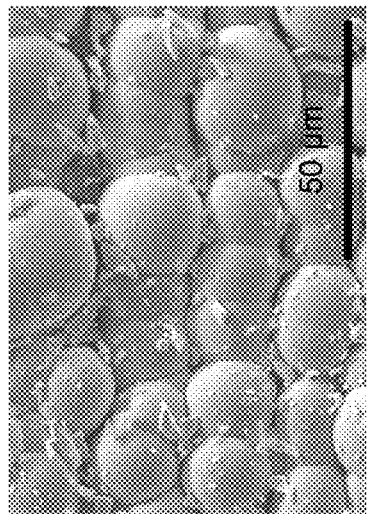
FIG. 13B is an SEM image of an iron-tungsten coating formed using a current density of about 0.025 A/cm$^2$ in accordance with an embodiment of the present disclosure.

The resulting electrolyte solution of Example 1 was pH adjusted to about 7.5. A mild steel substrate was plated by passing a direct current using a platinized titanium mesh anode. The current density was maintained at about 0.025 A/cm$^2$, the temperature was maintained at about 60° C., and the pH was maintained at about 7.5. A bright hard coating was formed on the mild steel substrate. An SEM image of the bright hard coating is shown in FIG. 13B.

EXAMPLE 4

Figure 13C:
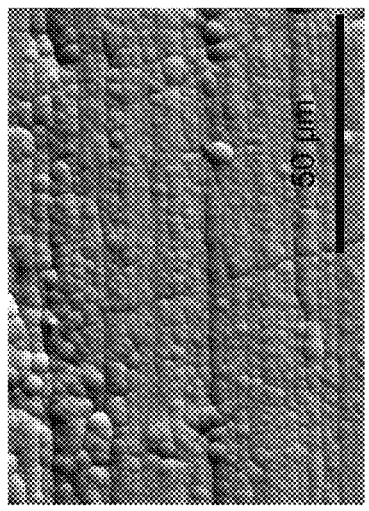
FIG. 13C is an SEM image of an iron-tungsten coating formed using a current density of about 0.05 A/cm$^2$ in accordance with an embodiment of the present disclosure.

The resulting electrolyte solution of Example 1 was pH adjusted to about 7.5. A mild steel substrate was plated by passing a direct current using a platinized titanium mesh anode. The current density was maintained at about 0.05 A/cm$^2$, the temperature was maintained at about 60° C., and the pH was maintained at about 7.5. A dull coating was formed on the mild steel substrate. An SEM image of the dull coating is shown in FIG. 13C.

EXAMPLE 5

Figure 13D:
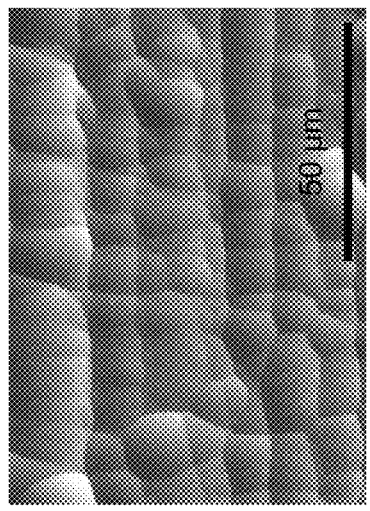
FIG. 13D is an SEM image of the black coating of FIG. 12B formed using a current of about 0.075 A/cm$^2$.
Figure 12B:
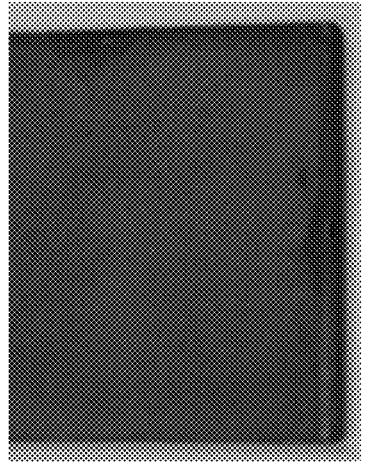
FIG. 12B is an image of a dull iron-tungsten coating formed on a mild steel alloy in accordance with an embodiment of the present disclosure.

The resulting electrolyte solution of Example 1 was pH adjusted to about 7.5. A mild steel substrate was plated by passing a direct current using a platinized titanium mesh anode. The current density was maintained at about 0.075 A/cm$^2$, the temperature was maintained at about 60° C., and the pH was maintained at about 7.5. A dull coating was formed on the mild steel substrate as shown in FIG. 12B. An SEM image of the dull coating of FIG. 12B is shown in FIG. 13D.

As illustrated by Examples 2-5, different types of iron-tungsten coatings can be formed based on the current density even when the electrolyte solutions with the same content are used. Thus, the current density to be applied can be selected to obtain the desired coating characteristics (e.g., bright vs. dull).

EXAMPLE 6

Figure 16A:
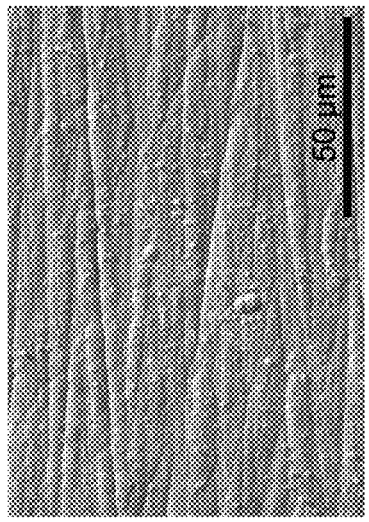
FIG. 16A is an SEM image of the bright hard coating of FIG. 15A formed using a current density of about 0.01 A/cm$^2$.
Figure 15A:
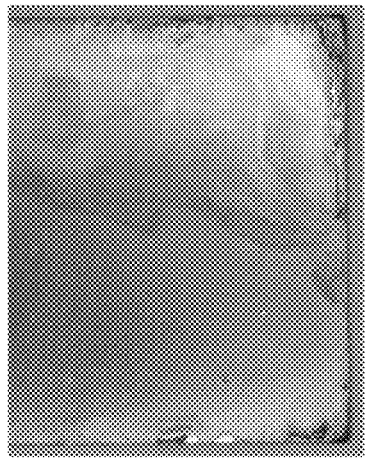
FIG. 15A is an image of a bright hard iron tungsten coating formed on a brass substrate in accordance with an embodiment of the present disclosure.

The resulting electrolyte solution of Example 1 was pH adjusted to about 7.5. A brass substrate was plated by passing a direct current using a platinized titanium mesh anode. The current density was maintained at about 0.01 A/cm$^2$, the temperature was maintained at about 60° C., and the pH was maintained at about 7.5. A bright hard coating was formed on the brass substrate as shown in FIG. 15A. An SEM image of the bright hard coating of FIG. 15A is shown in FIG. 16A.

The appearance of the bright hard coating formed on the brass substrate as shown in FIG. 15A is similar to the bright hard coating formed on the mild steel substrate as shown in FIG. 12A. Further, the microstructure (e.g., the surface topography) of the bright hard coating formed on the brass substrate as shown in FIG. 15B is similar to the bright hard coating formed on the mild steel substrate as shown in FIG. 12B.

EXAMPLE 7

Figure 16B:
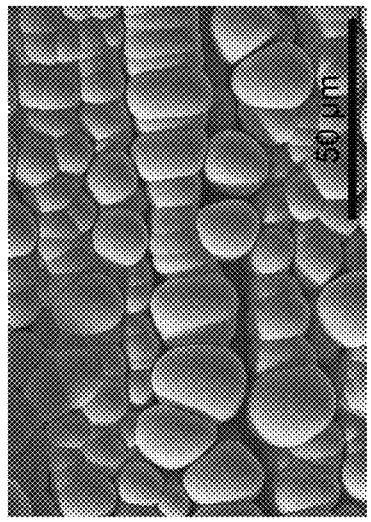
FIG. 16B is an SEM image of the dull coating of FIG. 15B formed using a current of about 0.075 A/cm$^2$.

The resulting electrolyte solution of Example 1 was pH adjusted to about 7.5. A brass substrate was plated by passing a direct current using a platinized titanium mesh anode. The current density was maintained at about 0.075 A/cm$^2$, the temperature was maintained at about 60° C., and the pH was maintained at about 7.5. A dull coating was formed on the brass substrate as shown in FIG. 15B. An SEM image of the dull coating of FIG. 15B is shown in FIG. 16B.

Figure 15B:
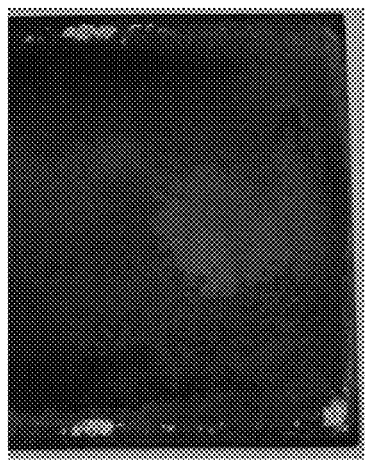
FIG. 15B is an image of a dull iron-tungsten coating formed on a brass substrate in accordance with an embodiment of the present disclosure.

The appearance of the dull coating formed on the brass substrate as shown in FIG. 15B is similar to the dull coating formed on the mild steel substrate as shown in FIG. 12B. Further, the microstructure (e.g., the surface topography) of the dull coating formed on the brass substrate as shown in FIG. 15B is similar to the dull coating formed on the mild steel substrate as shown in FIG. 12D.

As illustrated by Examples 2-7, bright hard iron-tungsten coatings and dull iron-tungsten coatings can be formed on various substrates. Although mild steel substrates and brass substrates were used in Examples 2-7, the substrates are not limited to these substrates and various other substrates can be plated with an iron-tungsten coating. For example, the substrate can be other steel substrates, copper substrates, brass substrates, copper-coated substrates, nickel-coated substrates or other metal or metal alloy substrates.

EXAMPLE 8

Figure 18:
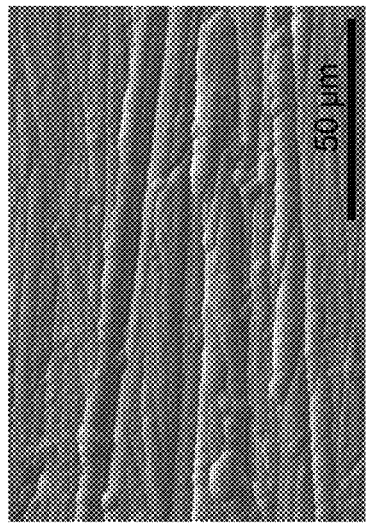
FIG. 18 is an SEM image of the bright hard coating of FIG. 17.
Figure 17:
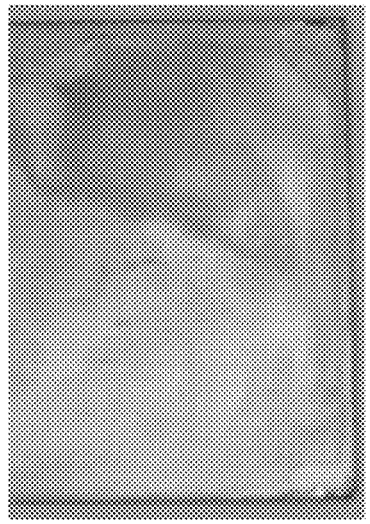
FIG. 17 is an image of a bright hard iron-tungsten coating formed on a substrate using pulsed current in accordance with an embodiment of the present disclosure.
Figure 19:
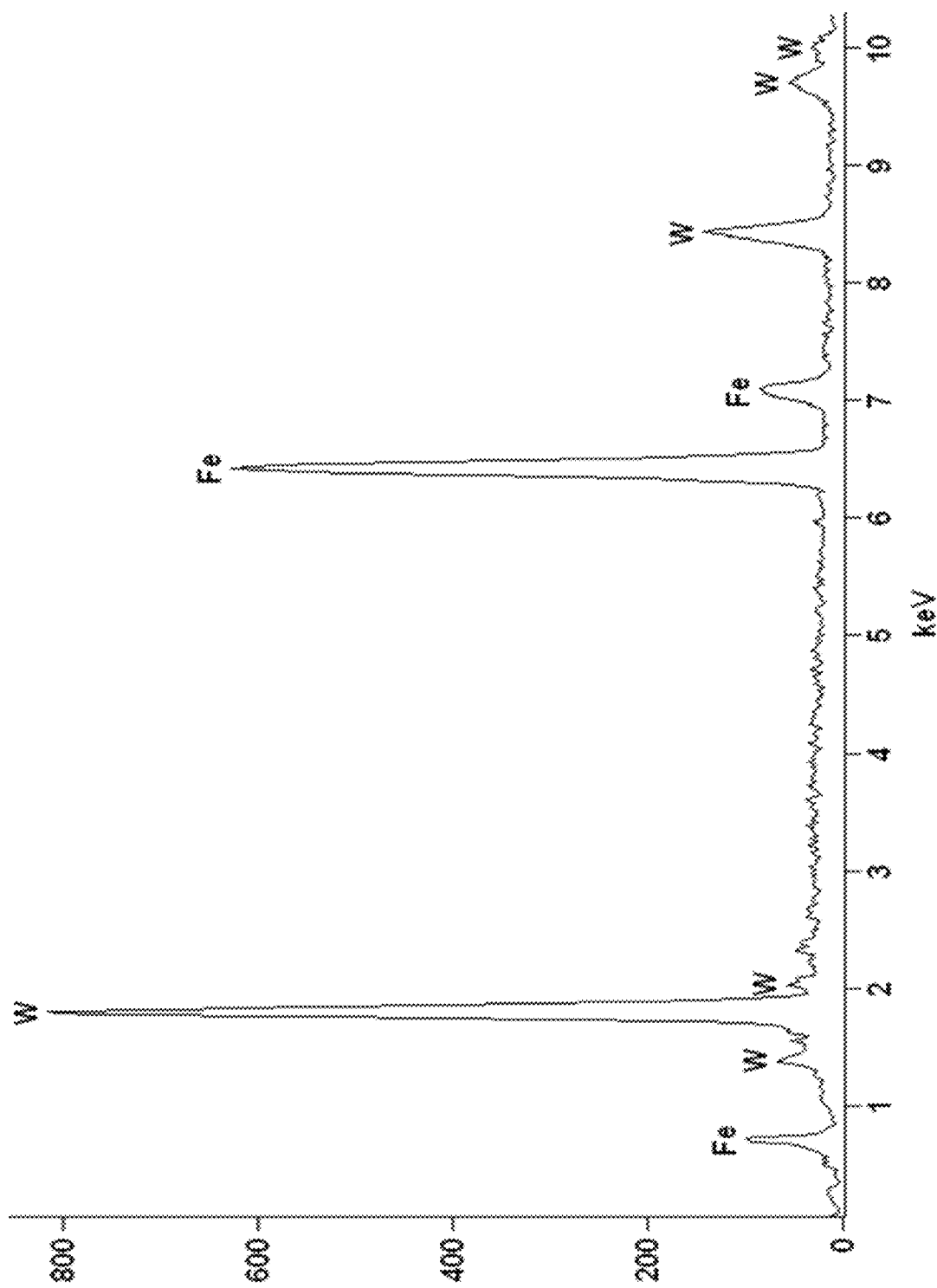
FIG. 19 is an energy-dispersive X-ray spectroscopy spectrum of the bright hard coating of FIG. 17.

The resulting electrolyte solution of Example 1 was pH adjusted to about 7.5. A mild steel substrate was plated for about 2 hours by passing a pulsed current using a platinized titanium mesh anode. The average current density was about 0.01 A/cm$^2$, the peak current density was about 0.0115 A/cm$^2$, and the duty cycle was 87% (20/23) with a time on ($t_{on}$) of 20 ms and a time off ($t_{off}$) of 3 ms. The temperature was maintained at about 60° C., and the pH was maintained at about 7.5. A bright hard coating was formed on the mild steel substrate as shown in FIG. 17. An SEM image of the bright hard coating of FIG. 17 is shown in FIG. 18. FIG. 19 shows an energy-dispersive X-ray spectroscopy spectrum of the bright hard coating of FIG. 17.

Visual inspection of the bright hard coatings shown in FIG. 17 indicates smooth and bright hard coatings similar to those formed using direct current as shown in FIG. 12A. Also, the microstructure (e.g., the surface topography) of the bright hard coating formed using pulsed current as shown in FIG. 18 was similar to those formed using direct current as shown in FIG. 13A. However, there is slight increase in the tungsten content (25.17 At %) of the coating formed using pulsed current as compared to the coatings (22.7 At %) formed using direct current when electrolyte solutions with the same content is used. Further, pulsed current deposition at different current densities can be advantageously used for depositing multiple layers with varying Fe:W ratio and/or varying hardness/modulus from the same electrolyte solution.

EXAMPLE 9

The resulting electrolyte solution of Example 1 was used to plate a Hull cell panel. The current applied was about 1 Ampere, and the temperature was maintained at 55° C. The initial current was 0.9 A and the final current was also 0.9 A. The initial voltage was about 5.6 V and the final voltage was 5.3 V. The plating was performed for 5 min.

The 1 ampere Hull cell panel coated from the electrolyte solution of Example 1 is shown in FIG. 20A. The current density decreases from left to right. A dark/black dull coating was obtained at high current densities (the left), a dark dull coating was obtained at mid-current densities (the middle), and a bright coating was obtained at lower current densities (the right).

EXAMPLE 10

Iron (II) sulfate heptahydrate, sodium citrate dihydrate, sodium tungstate dihydrate, and anhydrous citric acid were dissolved in an aqueous media as described in Example 1. Further, about 17 g (0.32 mol) of ammonium chloride and about 9 g of sodium bromide (about 0.087 mol) per liter of electrolyte solution to be formed was dissolved. Although ammonium chloride was used in this example, one or more other ammonium halide can be used instead of, or in addition to, ammonium chloride. Also, although sodium bromide was used in this example, one or more other alkali metal halide can be used instead of, or in addition to, sodium bromide.

EXAMPLE 11

The resulting electrolyte solution of Example 10 was used to plate a Hull cell panel. The current applied was about 1 Ampere, and the temperature was maintained at 55° C. The plating was performed for 5 min.

The 1 ampere Hull cell panel coated from the electrolyte solution of Example 10 is shown in FIG. 20B. The current density decreases from left to right. A dull-bright coating was obtained across all current densities.

EXAMPLE 12

The resulting electrolyte solution of Example 10 was used to plate a Hull cell panel. The current applied was about 5 Ampere, and the temperature was maintained at 55° C. The plating was performed for 5 min.

The 5 ampere Hull cell panel coated from the electrolyte solution of Example 10 is shown in FIG. 20C. The current density decreases from left to right. A dull-bright coating was obtained across all current densities with a wider coverage across the panel.

As illustrated by Examples 10-12, a substrate can be plated from an electrolyte solution with additives such as ammonium chloride and sodium bromide to form an iron-tungsten coating that is dull-bright across a wider range of current densities and cover larger areas more uniformly.

When introducing elements of the present invention or exemplary aspects or embodiment(s) thereof, the articles "a," "an," "the," and "said" are intended to mean that there are one or more of the elements. The terms "comprising," "including," and "having" are intended to be inclusive and mean that there can be additional elements other than the listed elements. Although this invention has been described with respect to specific embodiments, the details of these embodiments are not to be construed as limitations. Different aspects, embodiments and features are defined in detail herein. Each aspect, embodiment or feature so defined can be combined with any other aspect(s), embodiment(s) or feature(s) (preferred, advantageous or otherwise) unless clearly indicated to the contrary. Embodiments described above illustrate but do not limit the invention. It should also be understood that numerous modifications and variations are possible in accordance with the principles of the present disclosure. Accordingly, the scope of the invention is defined only by the following claims.

What is claimed is:

1. A method for plating a substrate using an electrolyte solution, the method comprising:
    preparing the electrolyte solution consisting of an aqueous medium; a divalent iron salt consisting of iron (II) sulfate, iron (II) halide, iron (II) nitrate, iron (II) acetate, or iron (II) perchlorate; an alkali metal citrate; a tungstate salt consisting of an alkali metal tungstate; a citric acid; and sodium hydroxide, potassium hydroxide, sulfuric acid, or a combination thereof by:
        dissolving in the aqueous medium, the divalent iron salt in an amount ranging from about 0.05 to about 0.5 mol per liter of the electrolyte solution and the alkali metal citrate in an amount ranging from about 0.05 to about 2 mol per liter of the electrolyte solution to form a first solution;
        dissolving in the first solution the tungstate salt in an amount ranging from about 0.1 to about 1.5 mol per liter of the electrolyte solution to form a second solution; and
        dissolving in the second solution the citric acid in an amount ranging from about 0.01 to about 1 mol per liter of the electrolyte solution to form the electrolyte solution;
    passing a current between a cathode and an anode through the electrolyte solution to deposit iron and tungsten on the substrate;
    forming a coating layer comprising an alloy of iron and tungsten having a tungsten content ranging from about 5 to about 18 At % or about 28 to about 40 At % when the pH of the electrolyte solution is maintained at about 3 to about 7; or
    forming a coating layer comprising an alloy of iron and tungsten having a tungsten content ranging from about 18 to about 28 At % when the pH of the electrolyte solution is maintained at about 7 to about 12.

2. The method of claim 1, wherein:
    the step of dissolving the divalent iron salt and the alkali metal citrate comprises dissolving iron (II) sulfate in an amount ranging from about 0.05 to about 0.2 mol per liter of the electrolyte solution and sodium citrate or potassium citrate in an amount ranging from about 0.15 to about 0.5 mol per liter of the electrolyte solution;
    the step of dissolving the tungstate salt comprises dissolving sodium tungstate in an amount ranging from about 0.15 to about 0.5 mol per liter of the electrolyte solution; and
    the step of dissolving the citric acid comprises dissolving the citric acid in an amount ranging from about 0.02 to about 0.5 mol per liter of the electrolyte solution.

3. The method of claim 1, wherein the step of passing the current is performed using a carbonaceous anode, a graphite anode, a platinum anode, or a platinized titanium anode to deposit iron and tungsten on the substrate comprising a steel substrate, a copper substrate, a brass substrate, a copper-coated substrate, a nickel-coated substrate, or a combination thereof.

4. The method of claim 1, wherein the step of passing the current comprises applying a direct current having a current density ranging from about 0.002 to about 0.04 A/cm$^2$ to form the coating layer comprising an alloy of iron and tungsten having a tungsten content ranging from about 18 to about 28 At %.

5. The method of claim 1, wherein the step of passing the current comprises applying a direct current having a current density ranging from about 0.05 to about 0.1 A/cm$^2$ to form the coating layer comprising an alloy of iron and tungsten having a tungsten content ranging from about 5 to about 18 At % or about 28 to about 40 At %.

6. The method of claim 1, wherein the step of dissolving the tungstate salt comprises dissolving the tungstate salt in an amount ranging from about 0.3 to about 0.45 mol per liter of the electrolyte solution to form the coating layer comprising an alloy of iron and tungsten having a tungsten content ranging from about 18 to about 28 At %.

7. The method of claim 1, wherein the step of dissolving the tungstate salt comprises dissolving the tungstate salt in an amount ranging from about 0.1 to about 0.3 mol per liter of the electrolyte solution to form the coating layer comprising an alloy of iron and tungsten having a tungsten content ranging from about 5 to about 18 At % or about 28 to about 40 At %.

8. The method of claim 1, further comprising maintaining a temperature of about 50 to about 70° C. during the step of passing the current to form the coating layer comprising an alloy of iron and tungsten having a tungsten content ranging from about 18 to about 28 At %.

9. The method of claim 1, further comprising maintaining a temperature of about 20 to about 50° C. during the step of passing the current to form the coating layer comprising an alloy of iron and tungsten having a tungsten content ranging from about 5 to about 18 At % or about 28 to about 40 At %.

10. The method of claim 1, wherein the step of dissolving the citric acid comprises dissolving the citric acid in an amount ranging from about 0.05 to about 0.25 mol per liter of the electrolyte solution to form the coating layer comprising an alloy of iron and tungsten having a tungsten content ranging from about 18 to about 28 At %.

11. The method of claim 1, wherein the step of dissolving the citric acid comprises dissolving the citric acid in an amount ranging from about 0.25 to about 0.5 mol per liter of the electrolyte solution to form the coating layer comprising an alloy of iron and tungsten having a tungsten content ranging from about 5 to about 18 At % or about 28 to about 40 At %.

12. The method of claim 1, wherein the step of passing the current comprises:
applying a first direct or pulsed current having a first current density during at least one time interval to form the coating layer having a tungsten content ranging from about 5 to about 18 At % or about 28 to about 40 At %; or
applying a second direct or pulsed current having a second current density during at least one second time interval to form the coating layer having a tungsten content ranging from about 18 to about 28 At %.

13. The method of claim 1, wherein the step of passing the current forms a plurality of iron-tungsten alloy coating layers comprising at least one coating layer comprising an alloy of iron and tungsten having a tungsten content ranging from about 5 to about 18 At % or about 28 to about 40 At % and at least one coating layer comprising an alloy of iron and tungsten having a tungsten content ranging from about 18 to about 28 At %.

14. The method of claim 13, wherein the step of passing the current comprises:
applying a first direct or pulsed current having a first current density during at least one time interval to form the coating layer having a tungsten content ranging from about 5 to about 18 At % or about 28 to about 40 At %; and
applying a second direct or pulsed current having a second current density during at least one second time interval to form the coating layer having a tungsten content ranging from about 18 to about 28 At %.

15. The method of claim 13, wherein a thickness of the at least one coating layer comprising an alloy of iron and tungsten having a tungsten content ranging from about 5 to about 18 At % is equal to a thickness of the at least one coating layer comprising an alloy of iron and tungsten having a tungsten content ranging from about 18 to about 28 At %.

16. The method of claim 13, wherein a thickness of the at least one coating layer comprising an alloy of iron and tungsten having a tungsten content ranging from about 5 to about 18 At % is different from a thickness of the at least one coating layer comprising an alloy of iron and tungsten having a tungsten content ranging from about 18 to about 28 At %.

17. The method of claim 1, wherein the divalent iron salt consists of iron (II) sulfate heptahydrate, the alkali metal citrate consists of sodium citrate dihydrate, and the tungstate salt consists of sodium tungstate dihydrate.

18. The method of claim 1, wherein the substrate comprises a Hull cell panel.

19. The method of claim 1, wherein the coating layer comprising an alloy of iron and tungsten having a tungsten content ranging from about 18 to about 28 At % is formed, and the pH of the electrolyte solution is maintained at about 7.5.

20. The method of claim 1, wherein the coating layer comprising an alloy of iron and tungsten having a tungsten content ranging from about 5 to about 18 At % or about 28 to about 40 At % is formed, and the pH of the electrolyte solution is maintained at about 3 or about 5.

* * * * *